(12) United States Patent
Yang et al.

(10) Patent No.: US 12,469,400 B2
(45) Date of Patent: Nov. 11, 2025

(54) COMMUNICATION SYSTEM AND COMMUNICATION METHOD

(71) Applicant: Metal Industries Research & Development Centre, Kaohsiung (TW)

(72) Inventors: Kuang-Shine Yang, Tainan (TW); Ping-Hua Su, Kaohsiung (TW); Chao Chieh Hsu, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 380 days.

(21) Appl. No.: 18/167,042

(22) Filed: Feb. 9, 2023

(65) Prior Publication Data

US 2024/0274017 A1  Aug. 15, 2024

(51) Int. Cl.
*G08G 5/55* (2025.01)
*B64U 10/25* (2023.01)
(Continued)

(52) U.S. Cl.
CPC ............... *G08G 5/55* (2025.01); *B64U 10/25* (2023.01); *G08G 5/57* (2025.01); *H04W 4/40* (2018.02); *H04W 4/90* (2018.02); *B64U 2101/57* (2023.01)

(58) Field of Classification Search
CPC ...... B64U 10/25; B64U 2101/57; G08G 5/55; G08G 5/57; H04W 4/40; H04W 4/90
See application file for complete search history.

(56) References Cited

U.S. PATENT DOCUMENTS

2016/0340006 A1\* 11/2016 Tang .......................... B63C 9/01
2019/0104496 A1\* 4/2019 Sogo ...................... G05D 1/104
(Continued)

FOREIGN PATENT DOCUMENTS

CN        104898695         9/2015
RU        2698893 C1 \*      8/2019
(Continued)

OTHER PUBLICATIONS

"Office Action of Taiwan Counterpart Application", issued on Apr. 25, 2023, p. 1-p. 7.
(Continued)

*Primary Examiner* — Dale Moyer
(74) *Attorney, Agent, or Firm* — JCIPRNET (57) ABSTRACT

The invention provides a communication system and a communication method. The communication system includes a wireless communication apparatus, a control center apparatus, and an unmanned aerial vehicle. The control center apparatus controls the unmanned aerial vehicle to fly within a first range, so that the unmanned aerial vehicle searches for the wireless communication apparatus within the first range. When the unmanned aerial vehicle finds the wireless communication apparatus within the first range, the control center apparatus controls the unmanned aerial vehicle to fly within a second range. The second range is equal to or less than a communicable range of the wireless communication apparatus. The unmanned aerial vehicle continuously receives a physiological information signal with physiological information transmitted by the wireless communication apparatus. The unmanned aerial vehicle transmits the physiological information signal back to the control center apparatus.

16 Claims, 6 Drawing Sheets

(51) Int. Cl.
  *G08G 5/57*  (2025.01)
  *H04W 4/40*  (2018.01)
  *H04W 4/90*  (2018.01)
  *B64U 101/57* (2023.01)

(56) References Cited

U.S. PATENT DOCUMENTS

| | | | |
|---|---|---|---|
| 2020/0385118 A1* | 12/2020 | Arngren | G05D 1/101 |
| 2021/0183214 A1* | 6/2021 | Attariani | G06Q 10/083 |
| 2021/0197967 A1 | 7/2021 | Song et al. | |
| 2021/0205663 A1 | 7/2021 | Blahnik et al. | |
| 2021/0269149 A1* | 9/2021 | Culver | B64U 10/60 |

FOREIGN PATENT DOCUMENTS

| | | |
|---|---|---|
| TW | 201636966 | 10/2016 |
| TW | 201717684 | 5/2017 |
| TW | M592417 | 3/2020 |
| TW | M594769 | 5/2020 |

OTHER PUBLICATIONS

"Office Action of Taiwan Counterpart Application", issued on Apr. 15, 2025, p. 1-p. 4.

* cited by examiner

COMMUNICATION SYSTEM AND COMMUNICATION METHOD

BACKGROUND

Technical Field

This disclosure relates to a communication architecture, in particular to a communication system and a communication method.

Description of Related Art

At present, the problem that mountain disaster rescue often encounters is the inability to quickly and precisely locate the position of the trapped person, and the inability to communicate with the trapped person in real time, and even to grasp their vital signs. Moreover, the inability to locate the trapped person quickly and precisely results in the inability to provide rescue supplies to the trapped person immediately to increase the chance of a successful rescue.

SUMMARY

The disclosure provides a communication system and a communication method for automatically searching for a person wearing a wireless communication apparatus to establish a wireless communication system.

The communication system of the disclosure includes a wireless communication apparatus, a control center apparatus, and an unmanned aerial vehicle. The wireless communication apparatus is disposed on a person and configured to obtain physiological information of the person. The unmanned aerial vehicle is connected to the control center apparatus. The control center apparatus controls the unmanned aerial vehicle to fly within a first range, so that the unmanned aerial vehicle searches for the wireless communication apparatus within the first range. When the unmanned aerial vehicle finds the wireless communication apparatus within the first range, the control center apparatus controls the unmanned aerial vehicle to fly within a second range. The second range is equal to or less than a communicable range of the wireless communication apparatus. The unmanned aerial vehicle continuously receives a physiological information signal with the physiological information transmitted by the wireless communication apparatus, and the unmanned aerial vehicle transmits the physiological information signal back to the control center apparatus.

The communication method of the disclosure includes the following. An unmanned aerial vehicle is connected by a control center apparatus. The unmanned aerial vehicle is controlled to fly within a first range by the control center apparatus, so that the unmanned aerial vehicle searches for a wireless communication apparatus within the first range. When the unmanned aerial vehicle finds the wireless communication apparatus within the first range, the unmanned aerial vehicle is controlled to fly within a second range by the control center apparatus, wherein the second range is equal to or less than a communicable range of the wireless communication apparatus. A physiological information signal with physiological information transmitted by the wireless communication apparatus is continuously received by the unmanned aerial vehicle. The physiological information signal is transmitted back to the control center apparatus by the unmanned aerial vehicle.

Based on the above, the communication system and the communication method of the disclosure may establish communication between the control center apparatus and the wireless communication apparatus through the unmanned aerial vehicle to achieve a reliable communication connection architecture.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order that the content of the disclosure may be more easily understood, the following embodiments are given as examples according to which the disclosure can indeed be implemented. In addition, wherever possible, elements/components/steps using the same reference numerals in the drawings and embodiments represent the same or similar parts.

Figure 1:
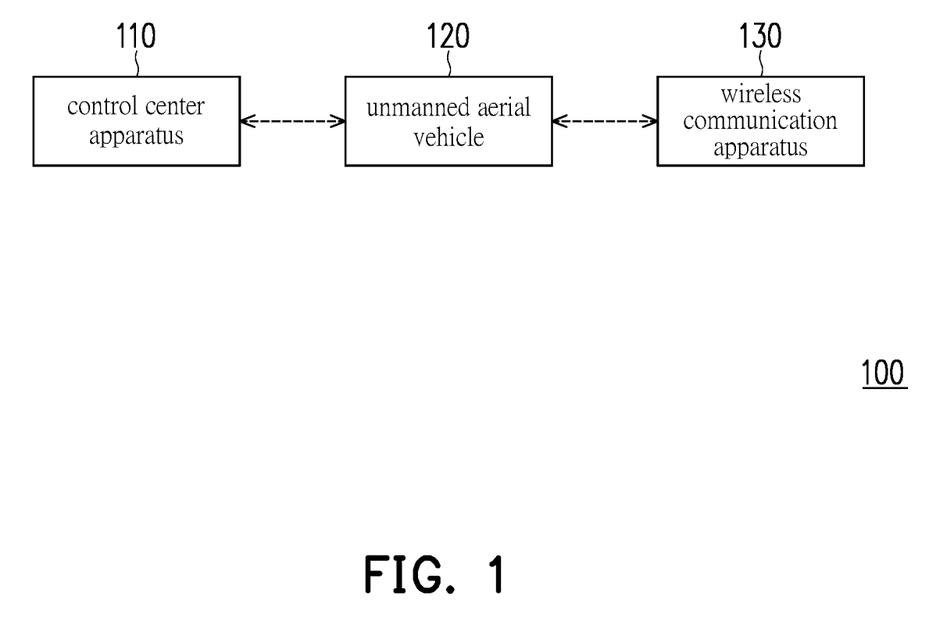
FIG. 1 is a schematic block diagram of a communication system according to an embodiment of the disclosure.

FIG. 1 is a schematic block diagram of a communication system according to an embodiment of the disclosure. Referring to FIG. 1, a communication system 100 includes a control center apparatus 110, an unmanned aerial vehicle 120, and a wireless communication apparatus 130. The control center apparatus 110 may be wirelessly communicated with the unmanned aerial vehicle 120 to remotely control the unmanned aerial vehicle 120 to search for wireless signals emitted by the wireless communication apparatus 130. When the unmanned aerial vehicle 120 finds the wireless signals emitted by the wireless communication apparatus 130, the unmanned aerial vehicle 120 may remain within a communicable range of the wireless communication apparatus 130, so as to maintain a communication connection between the unmanned aerial vehicle 120 and the wireless communication apparatus 130. In this way, the control center apparatus 110 may receive relevant information from the wireless communication apparatus 130 through the unmanned aerial vehicle 120, so as to achieve a reliable communication connection architecture. From another perspective, the unmanned aerial vehicle 120 may function as a communication relay station.

Figure 2:
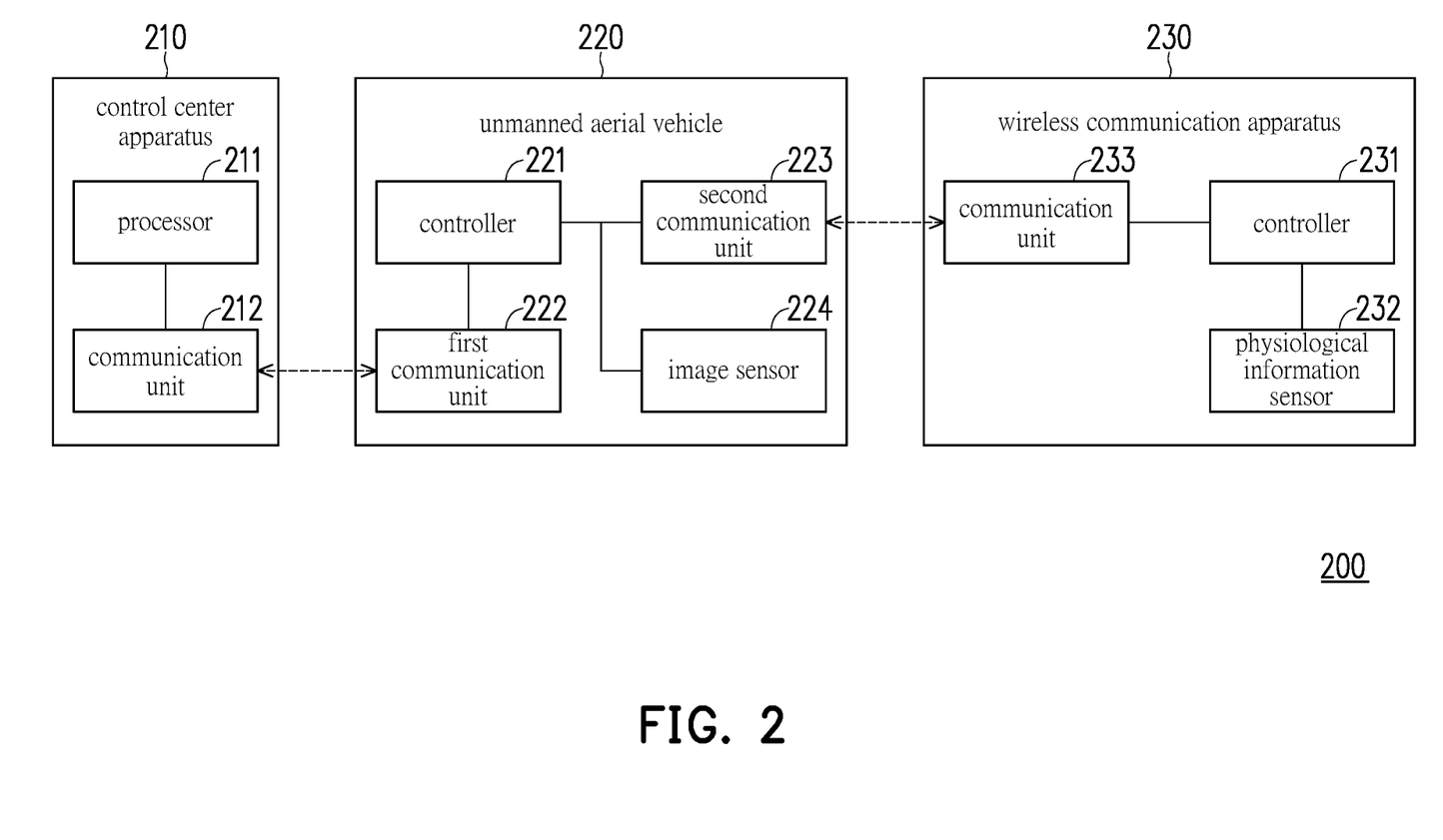
FIG. 2 is a schematic circuit diagram of a communication system according to an embodiment of the disclosure.

FIG. 2 is a schematic circuit diagram of a communication system according to an embodiment of the disclosure. Referring to FIG. 2, in this embodiment, the communication system 200 includes a control center apparatus 210, an unmanned aerial vehicle 220, and a wireless communication apparatus 230. The control center apparatus 210 may include a processor 211 and a communication unit 212. The processor 211 is coupled to the communication unit 212. The control center apparatus 210 may be implemented, for example, in the form of a personal computer (PC), a panel PC, or a workstation computer, etc., and the disclosure is not limited thereto.

In this embodiment, the unmanned aerial vehicle 220 may include a controller 221, a first communication unit 222, a second communication unit 223, and an image sensor 224. The controller 221 is coupled to the first communication unit 222, the second communication unit 223, and the image sensor 224. The unmanned aerial vehicle 220 may be implemented, for example, in the form of a rotorcraft, a fixed-wing aircraft, or a fixed-rotor aircraft, and the disclosure is not limited thereto. The unmanned aerial vehicle 220 may also include other functional elements required for flight, such as battery modules and motor modules.

In this embodiment, the wireless communication apparatus 230 may include a controller 231, a physiological information sensor 232, and a communication unit 233. The controller 231 is coupled to the physiological information sensor 232 and the communication unit 233. The wireless communication apparatus 230 may be, for example, a smart watch or other wearable devices, and may be disposed (worn) on a person to instantly monitor physiological information of the person, such as body temperature, heart rate, blood pressure, and/or blood oxygen.

In this embodiment, the first communication unit 222 of the unmanned aerial vehicle 220 is configured to communicate with the communication unit 212 of the control center apparatus 210. The second communication unit 223 of the unmanned aerial vehicle 220 is configured to communicate with the communication unit 233 of the wireless communication apparatus 230. The first communication unit 222 and the second communication unit 223 may use different communication protocols respectively. In this embodiment, the communication connection between the communication unit 212 of the control center apparatus 210 and the first communication unit 222 of the unmanned aerial vehicle 220 may be established, for example, using a communication protocol of a 5th generation mobile networks (5G) technology. The communication connection between the communication unit 233 of the wireless communication apparatus 230 and the second communication unit 223 of the unmanned aerial vehicle 220 may be established, for example, using LoRa communication protocol.

In this embodiment, the processor 211, the controller 221, and the controller 231 may respectively include, for example, a central processing unit (CPU), or other programmable general-purpose or special-purpose microprocessors, digital signal processor (DSP), application specific integrated circuits (ASIC), programmable logic device (PLD), other similar processing circuits, or a combination of these devices. In addition, each of the above-mentioned communication units may include, for example, a communication interface, a communication module, a communication antenna, and related communication circuits.

Figure 3:
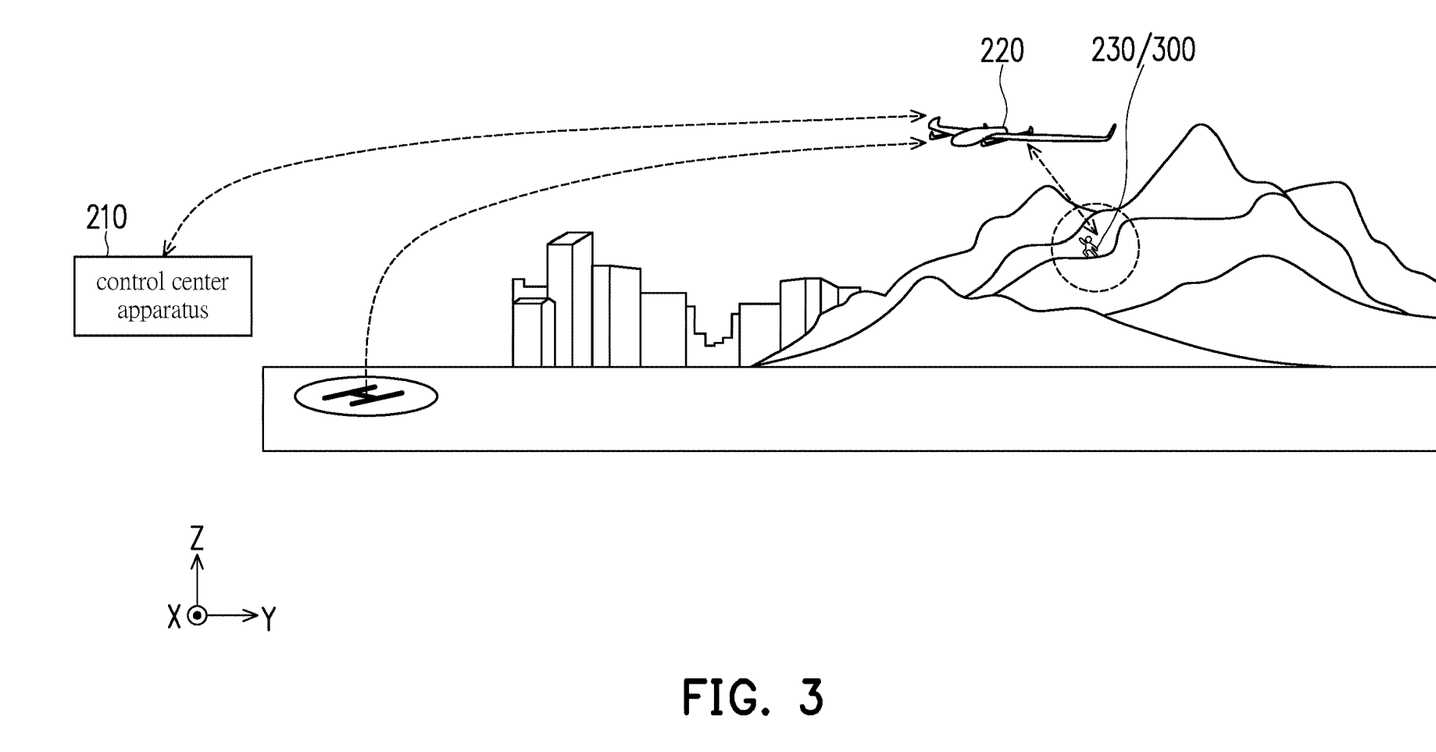
FIG. 3 is a schematic diagram of a communication architecture according to an embodiment of the disclosure.
Figure 4:
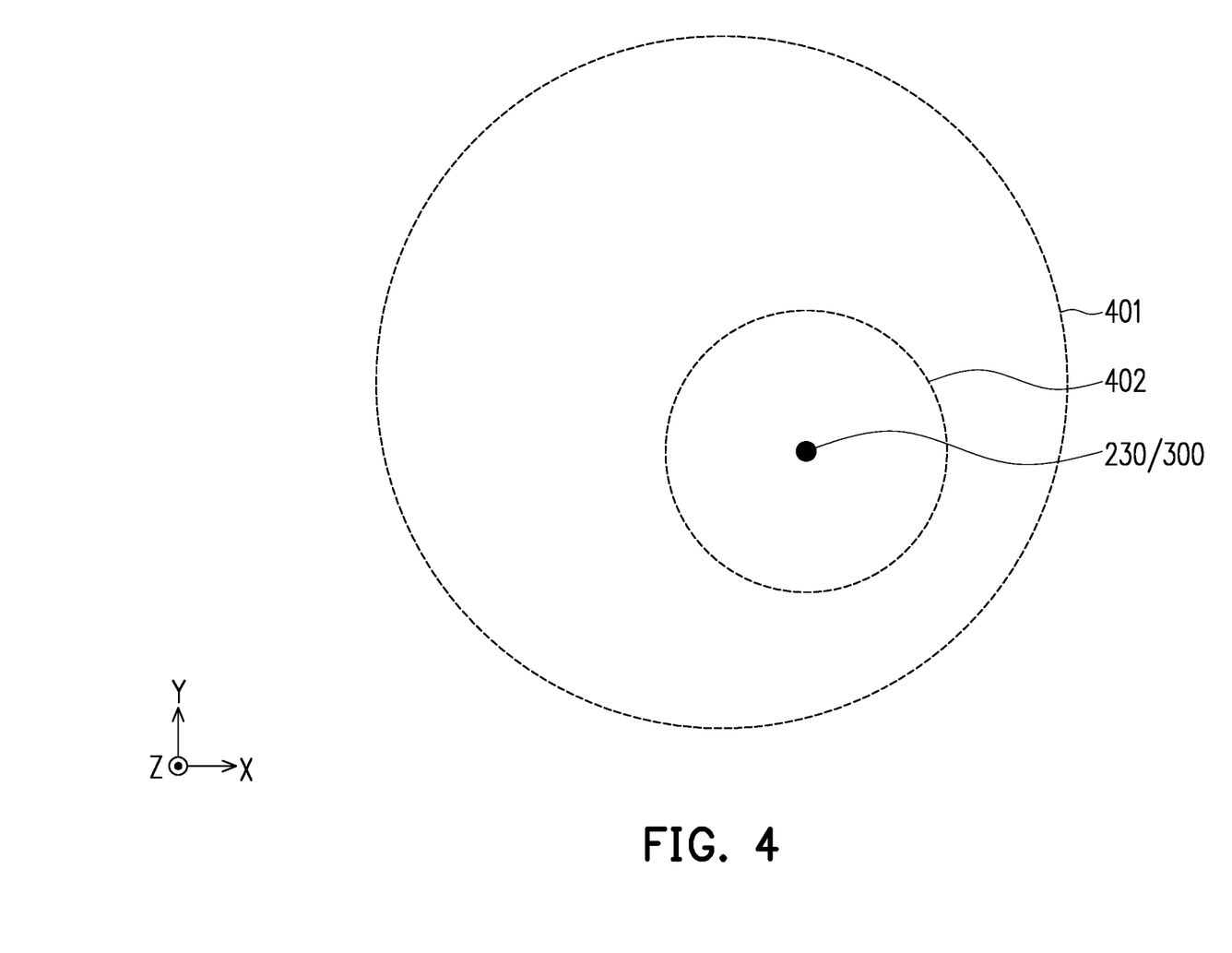
FIG. 4 is a schematic diagram of a first range and a second range according to an embodiment of the disclosure.

FIG. 3 is a schematic diagram of a communication architecture according to an embodiment of the disclosure. FIG. 4 is a schematic diagram of a first range and a second range according to an embodiment of the disclosure. Referring to FIG. 2 to FIG. 4, in this embodiment, the communication system 200 may be applied, for example, to a scene of rescue in a mountain disaster. A plane formed by extending along a direction X and a direction Y may, for example, be parallel to the ground. A direction Z may, for example, be oriented toward the sky. The direction X, the direction Y, and the direction Z may be perpendicular to each other. The direction X and the direction Y may be horizontal directions respectively. The direction Z may be a vertical direction. As shown in FIG. 3, before establishing a communication connection, a person 300 may, for example, wear a wireless communication apparatus 230 in a deep mountain. In the event of a mountain disaster, the control center apparatus 210 may remotely control the unmanned aerial vehicle 220 to fly to the mountain location and hover at a specific altitude. However, since it is not yet possible to precisely locate the position of the person 300, the unmanned aerial vehicle 220 may, for example, maintain a specific altitude and conduct a search according to a first range 401 as shown in FIG. 4. FIG. 4 may, for example, be a result of looking down on the ground from the sky, and is used to indicate the location and extent of the first range 401 and a second range 402 in relation to each other. When the unmanned aerial vehicle 220 finds a wireless communication signal emitted by the wireless communication apparatus 230, the unmanned aerial vehicle 220 may lock the position of the wireless communication apparatus 230 (i.e., the position of the person 300), and maintain the communication connection between the unmanned aerial vehicle 220 and the wireless communication device 230 according to the second range 402.

Figure 5:
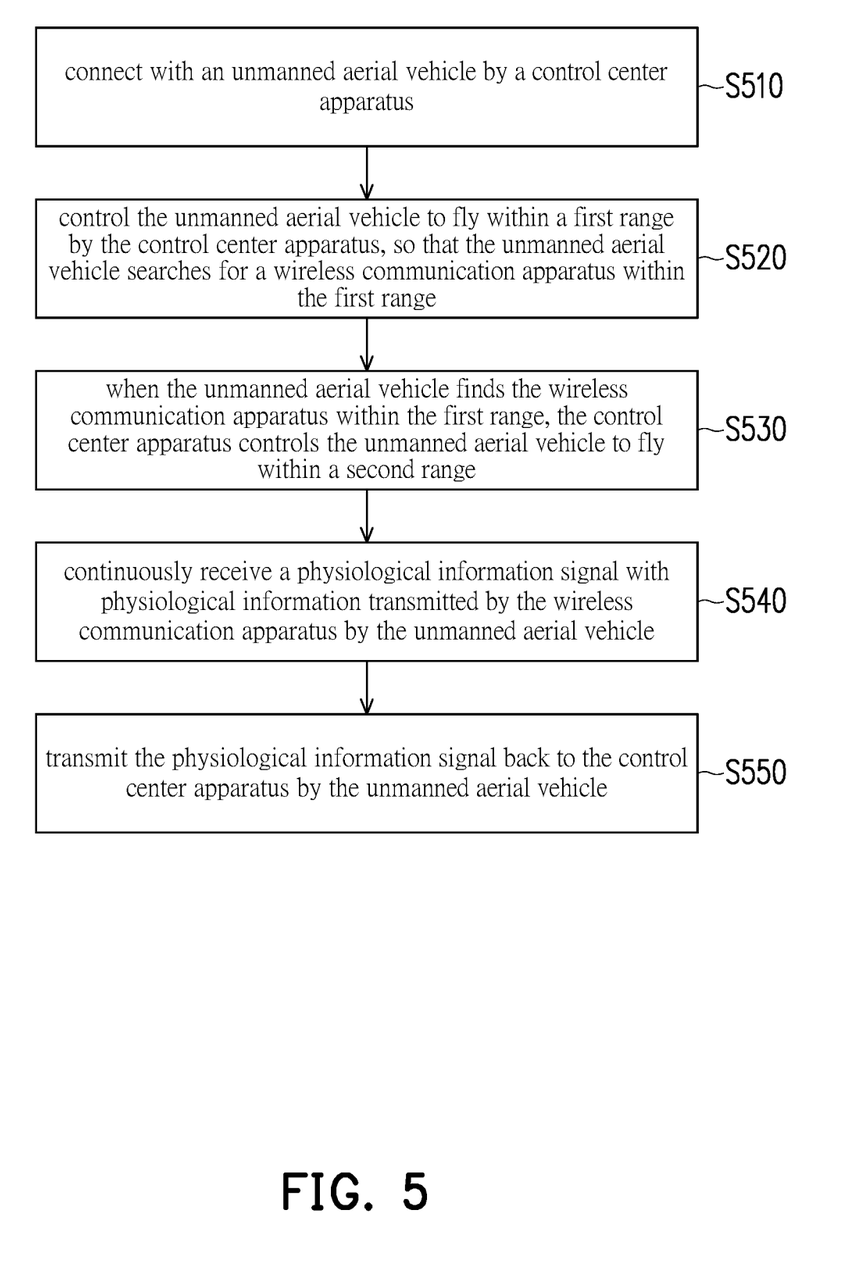
FIG. 5 is a flowchart of a communication method according to an embodiment of the disclosure.

FIG. 5 is a flowchart of a communication method according to an embodiment of the disclosure. Referring to FIG. 2 to FIG. 5, the communication system 200 may specifically execute the following steps S510 to S550 to establish a communication connection. In step S510, the control center apparatus 210 is connected with the unmanned aerial vehicle 220. In step S520, the control center apparatus 210 controls the unmanned aerial vehicle 220 to fly within the first range 401, so that the unmanned aerial vehicle 220 searches for the wireless communication apparatus 230 within the first range 401.

In step S530, when the unmanned aerial vehicle 220 finds the wireless communication apparatus 230 within the first range 401, the control center apparatus 210 controls the unmanned aerial vehicle 220 to fly within the second range 402. In this embodiment, the first range 401 may be greater than the second range 402. The second range 402 is equal to or less than a communicable range of the wireless communication apparatus 230. The first range 401 and the second range 402 may at least partially overlap with each other. In other words, the unmanned aerial vehicle 220 may effectively search for the wireless communication apparatus 230 by cruising over a wide area first. Moreover, when the unmanned aerial vehicle 220 finds (receives) the wireless communication signal emitted by the wireless communication apparatus 230, the unmanned aerial vehicle 220 may maintain the communication connection between the unmanned aerial vehicle 220 and the wireless communication apparatus 230 by cruising in a small area.

In step S540, the unmanned aerial vehicle 220 continuously receives (collects) a physiological information signal with the physiological information transmitted by the wireless communication apparatus 230. In this embodiment, the wireless communication apparatus 230 may be configured to monitor the physiological information of the person 300 in a timely and continuous manner, and to send the physiological information signal with the physiological information to the unmanned aerial vehicle 220. In addition, in one embodiment, the wireless communication apparatus 230 may also be configured to transmit global positioning system (GPS) positioning information to the unmanned aerial vehicle 220. The wireless communication apparatus 230 may have a global positioning system positioning chip, and may implement a global positioning system positioning function. In another embodiment, the wireless communication apparatus 230 may also be configured to transmit interactive information to the unmanned aerial vehicle 220. The interactive information may include audio information or video information, for example.

In step S550, the unmanned aerial vehicle 220 transmits the physiological information signal back to the control center apparatus 210. In this embodiment, the unmanned aerial vehicle 220 may also obtain an image signal of real-time image information through the image sensor 224, and further send the image signal to the control center apparatus 210. In this way, the control center apparatus 210 may obtain real-time images of the current environment and real-time physiological information of the person 300. In addition, in one embodiment, the unmanned aerial vehicle 220 may also transmit GPS positioning information and/or interactive information to the control center apparatus 210, so that an operator of the control center apparatus 210 can also communicate with the personnel 300 in real time.

The control center apparatus 210 may control another unmanned aerial vehicle according to the real-time images of the current environment and/or the real-time physiological information of the person 300. The another unmanned aerial vehicle may be configured to deliver a specific material to the person 300 based on the physiological information. In other words, when the control center apparatus 210 automatically monitors the real-time hypothermia or hypotension of the person 300, the another unmanned aerial vehicle carrying the required specific material or specific medicine may additionally and automatically fly to the position of the person 300 according to the physiological information and the GPS positioning information of the wireless communication apparatus 230, and deliver the specific material or specific medicine to the person 300. The another unmanned aerial vehicle may be, for example, a fixed-wing aircraft having the capacity to carry a greater weight of objects, but the disclosure is not limited thereto.

Thus, the communication system 200 according to this embodiment may automatically establish a communication connection architecture between the control center apparatus 210, the unmanned aerial vehicle 220, and the wireless communication apparatus 230. The control center apparatus 210 may collect the physiological information of the person 300 monitored in real time by the wireless communication apparatus 230 through the unmanned aerial vehicle 220, and obtain the real-time images through the image sensor 224, so that the operator of the control center apparatus 210 may have real-time information about the physical condition and environmental conditions of the person 300. Moreover, the control center apparatus 210 according to this embodiment may also precisely lock the position of the person 300 to report back to the rescuers for effective mountain rescue operations. In addition, the communication system 200 according to this embodiment may also control another unmanned aerial vehicle to airdrop specific materials or specific medicines to the person 300 to help maintain the vital signs of the person 300.

Figure 6:
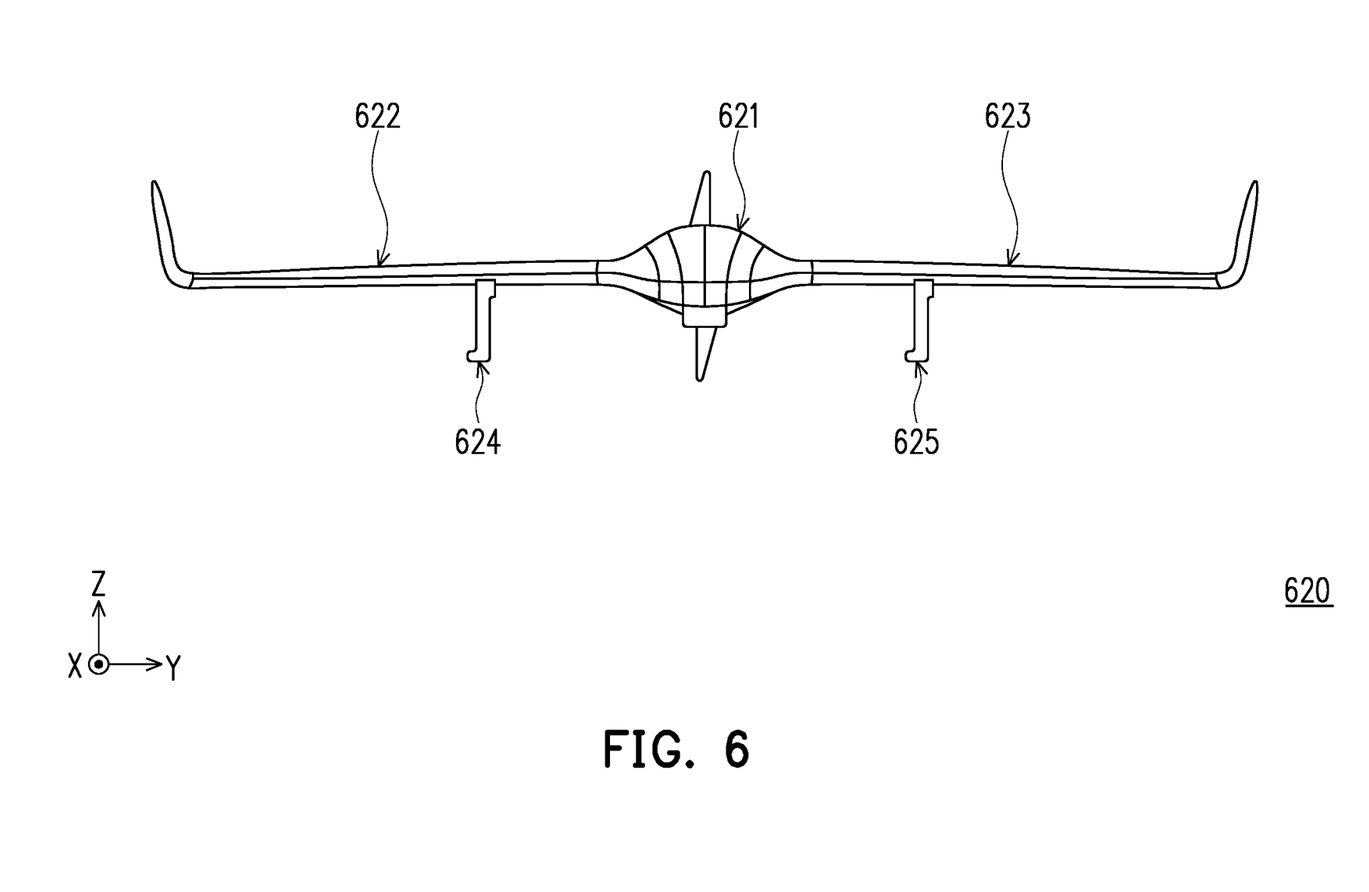
FIG. 6 is a schematic diagram of an unmanned aerial vehicle according to an embodiment of the disclosure.

FIG. 6 is a schematic diagram of an unmanned aerial vehicle according to an embodiment of the disclosure. Referring to FIG. 6, the unmanned aerial vehicle mentioned in each embodiment of the disclosure may be specifically implemented as an unmanned aerial vehicle 620 shown in FIG. 6. In this embodiment, the unmanned aerial vehicle 620 may be a fixed-wing aircraft. The unmanned aerial vehicle 620 may include a fuselage body 621, a first wing 622, a second wing 623, a first antenna 624, and a second antenna 625. The first wing 622 and the second wing 623 are symmetrically formed on both sides of the fuselage body 621. In this embodiment, the first communication unit in the above embodiment may include the first antenna 624, and the second communication unit in the above embodiment may include the second antenna 625. In this embodiment, the first antenna 624 and the second antenna 625 may be, for example, disposed on the first wing 622 and the second wing 623 respectively, and oriented towards the ground (e.g., the direction Z is toward the sky). The first wing 622 and the first antenna 624 may be integrally designed, and the second wing 623 and the second antenna 625 may be integrally designed. In this way, an effect of lightweight structure and low wind resistance may be achieved, and the first antenna 624 and the second antenna 625 may provide good communication transceiver effects.

To sum up, the communication system and the communication method of the disclosure may automatically and effectively establish a communication connection between the control center apparatus and the wireless communication apparatus through the unmanned aerial vehicle, which may be effectively applied to a scene of rescue in a mountain disaster. Moreover, the communication system and the communication method of the disclosure may realize the function of monitoring the physiological information of a person at a long distance, so that the control center apparatus may effectively monitor the physical condition of the person remotely, and may also automatically remote control another unmanned aerial vehicle to deliver materials to the person, so as to effectively increase the chance of successful rescue.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A communication system comprising:
   a wireless communication apparatus disposed on a person and configured to obtain physiological information of the person;
   a control center apparatus; and
   an unmanned aerial vehicle connected to the control center apparatus,
   wherein the control center apparatus controls the unmanned aerial vehicle to fly within a first range, such that the unmanned aerial vehicle searches for the wireless communication apparatus within the first range, and when the unmanned aerial vehicle finds the wireless communication apparatus within the first range, the control center apparatus controls the unmanned aerial vehicle to fly within a second range,
   wherein the second range is equal to or less than a communicable range of the wireless communication apparatus, the unmanned aerial vehicle continuously receives a physiological information signal with the physiological information transmitted by the wireless communication apparatus, and the unmanned aerial vehicle transmits the physiological information signal back to the control center apparatus;
   wherein the unmanned aerial vehicle comprises a first communication unit and a second communication unit, the first communication unit is configured to connect to the control center apparatus, and the second communication unit is configured to connect to the wireless communication apparatus, wherein the first communication unit and the second communication unit use different communication protocols, wherein a first antenna of the first communication unit is disposed on a first wing of the unmanned aerial vehicle, and a second antenna of the second communication unit is disposed on a second wing of the unmanned aerial vehicle.

2. The communication system according to claim 1 further comprising:

another unmanned aerial vehicle configured to deliver a specific material to the person based on the physiological information.

3. The communication system according to claim 1, wherein the wireless communication apparatus is a smart watch.

4. The communication system according to claim 1, wherein the wireless communication apparatus uses LoRa communication protocol.

5. The communication system according to claim 1, wherein the wireless communication apparatus is further configured to transmit global positioning system positioning information to the unmanned aerial vehicle, such that the global positioning system positioning information is transmitted to the control center apparatus through the unmanned aerial vehicle.

6. The communication system according to claim 1, wherein the wireless communication apparatus is further configured to transmit interactive information to the unmanned aerial vehicle, such that the interactive information is transmitted to the control center apparatus through the unmanned aerial vehicle.

7. The communication system according to claim 1, wherein the first range is greater than the second range.

8. The communication system according to claim 1, wherein the unmanned aerial vehicle further comprises an image sensor, and the unmanned aerial vehicle transmits an image signal obtained by the image sensor to the control center apparatus.

9. A communication method comprising:

connecting to an unmanned aerial vehicle by a control center apparatus;

controlling the unmanned aerial vehicle to fly within a first range by the control center apparatus, such that the unmanned aerial vehicle searches for a wireless communication apparatus within the first range;

when the unmanned aerial vehicle finds the wireless communication apparatus within the first range, controlling the unmanned aerial vehicle to fly within a second range by the control center apparatus, wherein the second range is equal to or less than a communicable range of the wireless communication apparatus;

continuously receiving a physiological information signal with physiological information transmitted by the wireless communication apparatus by the unmanned aerial vehicle; and transmitting the physiological information signal back to the control center apparatus by the unmanned aerial vehicle, wherein the unmanned aerial vehicle comprises a first communication unit and a second communication unit, the first communication unit is configured to connect to the control center apparatus, and the second communication unit is configured to connect to the wireless communication apparatus, wherein the first communication unit and the second communication unit use different communication protocols, wherein a first antenna of the first communication unit is disposed on a first wing of the unmanned aerial vehicle, and a second antenna of the second communication unit is disposed on a second wing of the unmanned aerial vehicle.

10. The communication method according to claim 9 further comprising:

controlling another unmanned aerial vehicle to deliver a specific material to the person based on the physiological information by the control center apparatus.

11. The communication method according to claim 9, wherein the wireless communication apparatus is a smart watch.

12. The communication method according to claim 9, wherein the wireless communication apparatus uses LoRa communication protocol.

13. The communication method according to claim 9 further comprising:

transmitting global positioning system positioning information to the unmanned aerial vehicle by the wireless communication apparatus, such that the global positioning system positioning information is transmitted to the control center apparatus through the unmanned aerial vehicle.

14. The communication method according to claim 9 further comprising:

transmitting interactive information to the unmanned aerial vehicle by the wireless communication apparatus, such that the interactive information is transmitted to the control center apparatus through the unmanned aerial vehicle.

15. The communication method according to claim 9, wherein the first range is greater than the second range.

16. The communication method according to claim 9 further comprising:

obtaining an image signal by an image sensor of the unmanned aerial vehicle, and transmitting the image signal to the control center apparatus by the unmanned aerial vehicle.

* * * * *